May 8, 1956 R. S. JENNEY ET AL 2,744,611
DELIVERY MECHANISM
Filed Sept. 13, 1950 9 Sheets-Sheet 3

Inventors:
Ray S. Jenney
Robert T. Fetherston
By Gary, Desmond & Parker, Attys.

May 8, 1956  R. S. JENNEY ET AL  2,744,611
DELIVERY MECHANISM
Filed Sept. 13, 1950  9 Sheets-Sheet 6

Inventors:
Ray S. Jenney
Robert T. Fetherston
By Gary, Desmond & Parker
Attys.

May 8, 1956  R. S. JENNEY ET AL  2,744,611
DELIVERY MECHANISM

Filed Sept. 13, 1950  9 Sheets-Sheet 9

Inventors:
Ray S. Jenney
Robert T. Fetherston
By Gary, Desmond & Parker
Attys.

United States Patent Office 2,744,611
Patented May 8, 1956

2,744,611

DELIVERY MECHANISM

Ray S. Jenney and Robert T. Fetherston, Battle Creek, Mich., assignors to Kellogg Company, Battle Creek, Mich., a corporation of Delaware Application September 13, 1950, Serial No. 184,544

10 Claims. (Cl. 198—32)

This invention relates to improvements in a machine for orderly arranging and sequentially delivering biscuits or the like which emerge from an oven in substantially parallel rows.

In the manufacture of baked or toasted articles of food, such as, biscuits, the articles, in one method of manufacture, are carried in a continuous manner through an oven on an endless conveyor. The capacity of such an oven depends, among other factors, upon the width of the conveyor; the greater the width, the greater the capacity other factors remaning the same. In most baking or toasting processes contemplated hereinabove, the most efficient arrangement of carrying the biscuits on the conveyor is to dispose them in a plurality of parallel rows disposed transversely to the direction of travel of the oven conveyor. Thus a plurality of rows of biscuits periodically emerges from the oven.

As an efficient method of handling the biscuits, it is desirable that the biscuits emerging from the oven be continuously transferred to a packaging machine which operates to package the biscuits as fast as they are discharged from the oven. However, when it is desired to pack a predetermined number of biscuits in each package, the biscuits emerging from the oven must be rearranged from the row-after-row delivery from the oven to a sequential delivery wherein the unit biscuits follow each other in seriatim to the packaging machine.

The present invention is particularly directed to a device which, when interposed between an oven and a packaging machine, converts the row-after-row oven delivery of the biscuits to a sequential delivery suitable for delivery to the packaging machine.

The objects and advantages of the present invention will be more apparent from the accompanying drawings and following detailed description.

The present invention will be shown and described in conjunction with the handling of shredded wheat biscuits, but it is to be understood that the invention is not limited to this specific food product, since any article of substantially similar shape to a shredded wheat biscuit may be handled advantageously, where the same problem exists of converting a row-after-row delivery to a sequential delivery.

Figure 1:
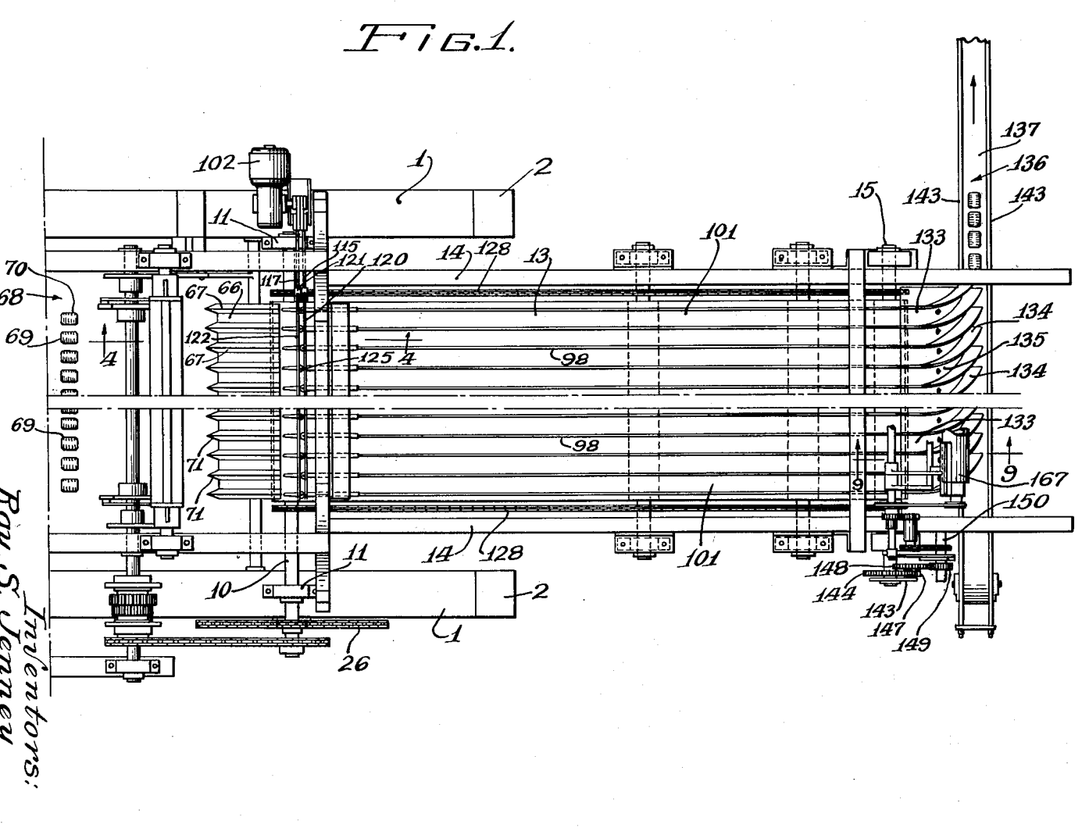
Fig. 1 is a top plan view of the delivery converting device comprising the present invention.
Figure 2:
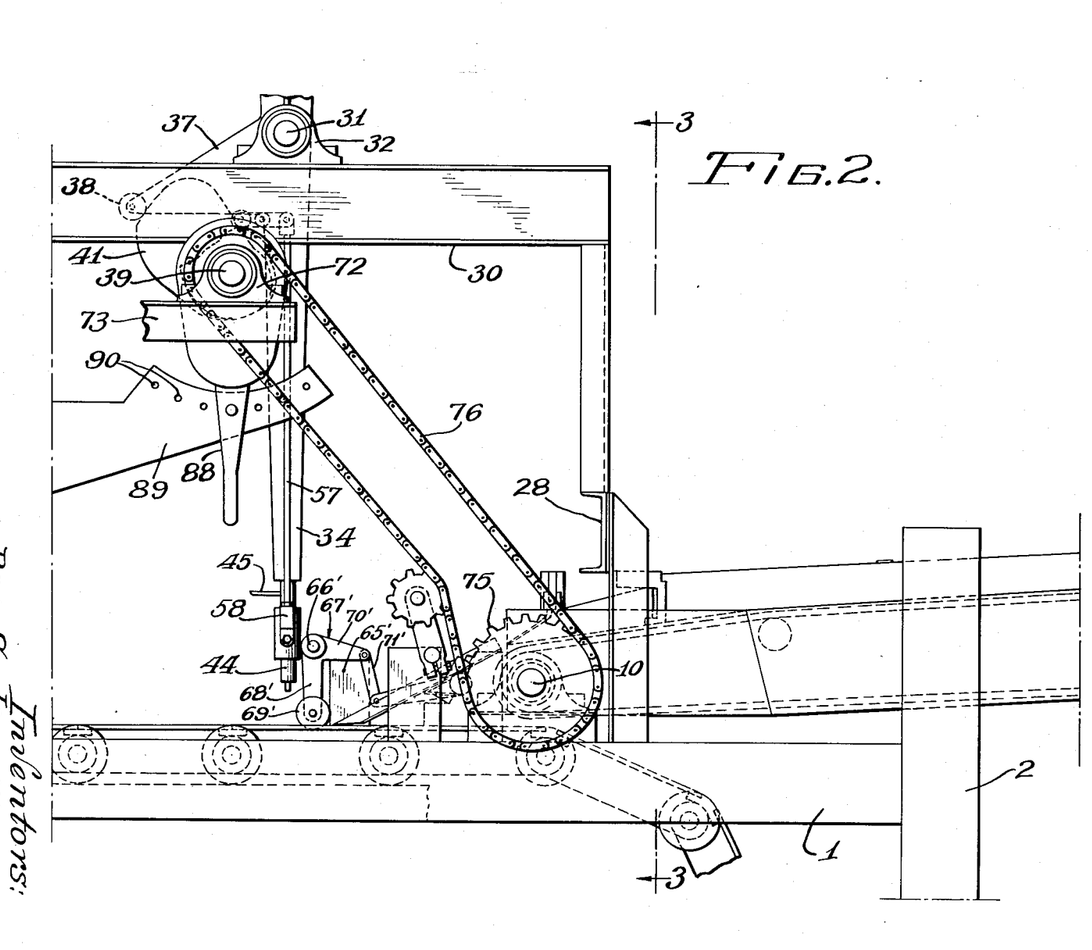
Figs. 2 and 2A, Fig. 2A constituting a continuation of Fig. 2, taken together comprise an enlarged side elevational view of the device shown in Fig. 1.

Referring particularly to the drawings and with specific reference to Figs. 1 and 2, 1—1 indicate spaced horizontal frame members comprising a portion of the oven (not shown) with which the present invention may be used. At their rear ends the frame members 1—1 may be supported by the oven and may comprise a part thereof, and at their front ends the members may be supported by upright posts 2—2. The extending portion of the oven including frame members 1—1 comprises a portion of the hearth of the oven and between said frame members a conveyor 3 (Fig. 4) moves outwardly from the oven carrying the baked or toasted shredded wheat biscuits.

The conveyor 3 is of the endless type, the upper or forward pass which carries the biscuits moving through the entire length of the oven. The conveyor 3 comprises opposite, articulated links 4, the set on one side only being shown in Fig. 4, the links being pivotally connected at their ends to transversely extending pins 5. Rollers 6 are carried upon the pins 5 and are supported during the upper or forward pass upon suitable tracks (not shown). Each of the links 4 carry inwardly extending flanges 7 upon which plates 8 are secured by means of rivets 9 or the like. The plates 8 extend across the conveyor and are adapted for the support of the rows of biscuits, the rows of biscuits being disposed parallel to the length of the plates, that is, transverse to the direction of travel of the conveyor.

Figure 2A:
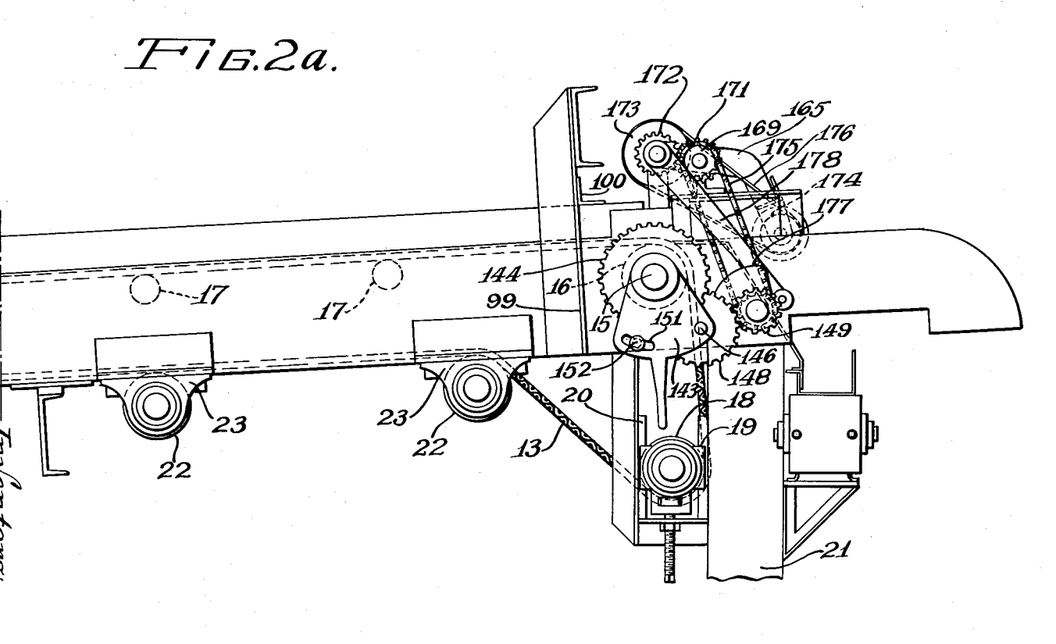
Figure 3:
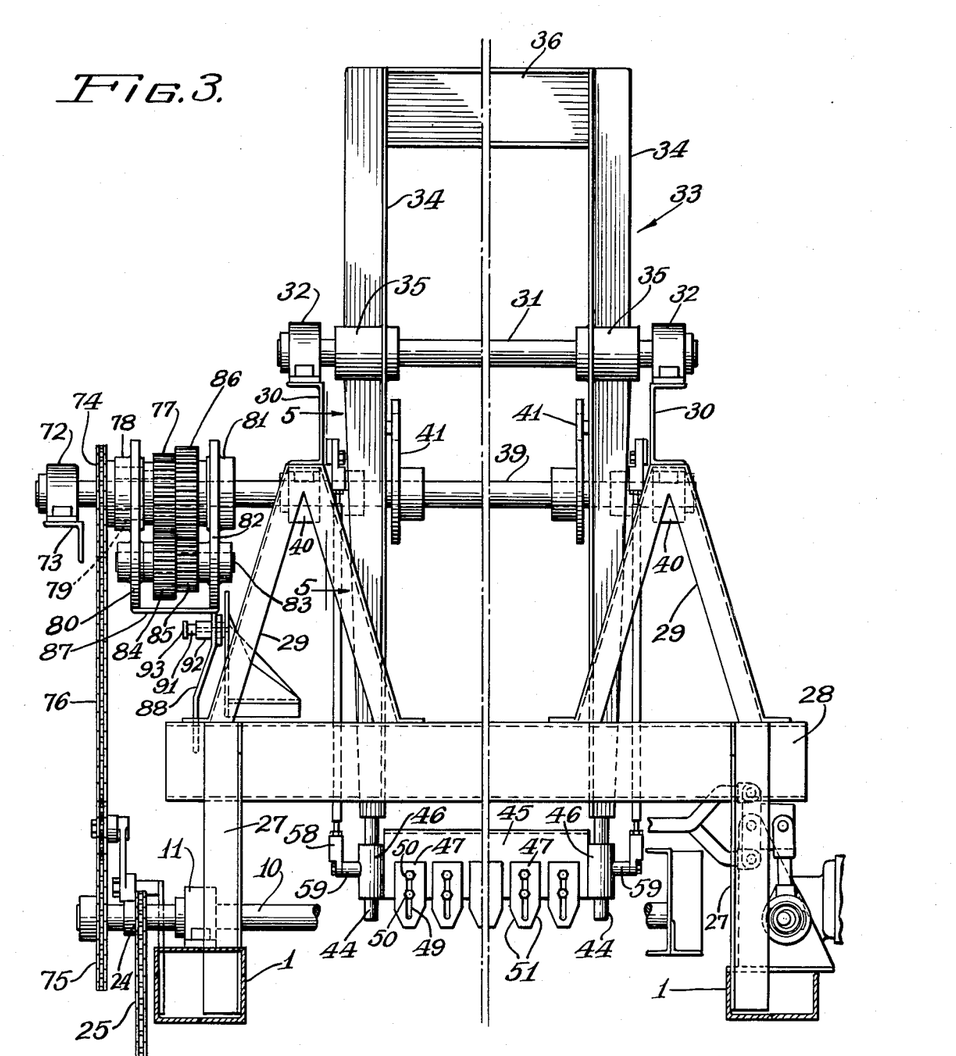
Fig. 3 is a transverse sectional view taken on line 3—3 of Fig. 2.

Referring particularly to Figs. 1, 2a and 3, a shaft 10 is journaled in bearings 11 carried upon the opposite horizontal frame members 1—1. A roll 12 (Fig. 4) is carried upon the shaft 10 and a screen conveyor 13 is trained around the roll 12 at the rear portion of its travel. A pair of frame members 14—14 extend forwardly and adjacent the forward end of said frame members a shaft 15 is journaled. A roll 16 is mounted upon shaft 15 and at the forward portion of travel of the conveyor screen 13, said screen is trained around the roll 16.

The upper pass of the screen 13 is supported at spaced intervals along its length by rolls or supporting bars 17 which extend transversely between the frame members 14—14. The screen 13 after passing over the forward roll 16 is trained around a tightening roll 18 which is carried by slidable bearing blocks 19 which, in turn, are vertically movable within guides 20. The screen tightening arrangement comprising roll 18, bearing blocks 19 and guides 20 is supported upon posts 21 which also function to support the forward end of the frame members 14—14. The screen 13 in making its lower pass is carried over rolls 22 which are journaled in bearings 23 carried upon the lower faces of the frame members 14—14. As will be hereinafter more fully described, screen 13 in making its upper pass carries shredded wheat biscuits forwardly upon its surface.

A sprocket wheel 24 (Fig. 3) is mounted upon shaft 10 and a sprocket chain 25 is trained around said wheel and functions to drive shaft 10. The sprocket chain 25 is also trained around a sprocket wheel 26 (Fig. 1) which in turn is carried upon the same shaft which functions to drive the forward sprocket wheels over which the oven conveyor 3 is trained. The arrangement is such that shaft 10 and hence screen 13 is driven in timed relationship with the movement of the oven conveyor 3.

Upright angle irons 27—27 (Fig. 3) support a transversely, horizontally disposed channel 28. A pair of A-frame members 29 are, in turn, supported by the channel 28. A pair of channel irons 30—30 are mounted at their forward ends upon the A-frame members 29, the channel members 30 being disposed horizontally and extending rearwardly parallel to the main frame members 1—1. The rear ends of the channel frame members 30—30 are supported by the oven (not shown).

A shaft 31 is journaled at its opposite ends in bearings 32—32 mounted upon the channel frame members 30—30. A frame 33, whose function, as will be hereinafter more fully described, is to push the shredded wheat biscuits forwardly toward the screen conveyor 13, is mounted upon shaft 31. The frame 33 comprises two spaced parallel members 34—34 which carry intermediate their length hubs 35—35 which in turn are keyed to shaft 31. The frame 33 and shaft 31 rock in the bearings 32—32. A portion of the parallel frame members 34—34 extend above shaft 31 and are joined by a spacer member 36, the upper portions of the members 34—34 and the cross member 36 functioning as a counter balance, as will be hereinafter more fully described.

Figure 5:
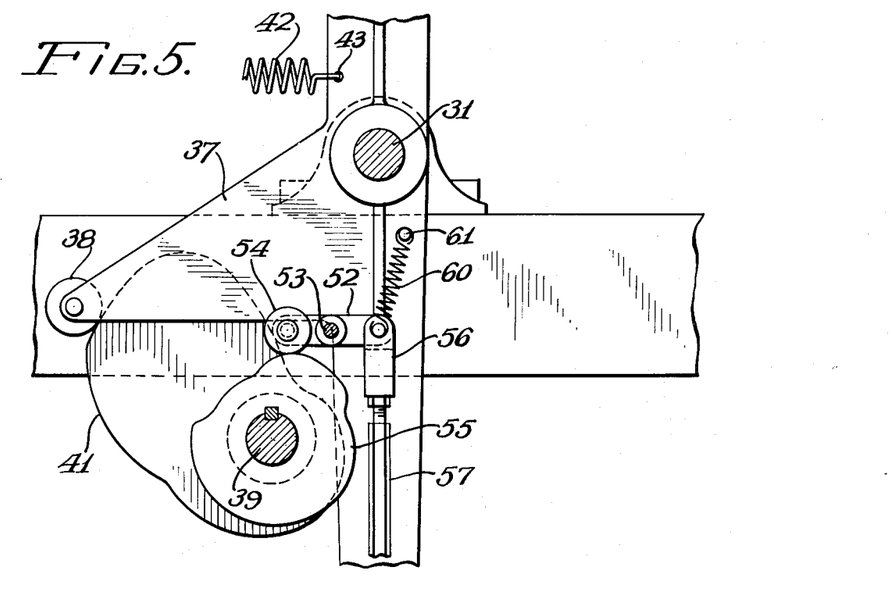
Fig. 5 is a detailed sectional view taken on line 5—5 of Fig. 3.

Referring particularly to Figs. 3 and 5, each of the frame members 34 carries a transversely extending arm 37 at the end of each of which a follower roller 38 is mounted. A shaft 39 is journaled in bearings 40—40 carried upon the lower portions of the opposite channel members 30. A pair of similar cams 41—41 are keyed to shaft 39, one adjacent each of the frame members 34. A coil spring 42 is anchored at one end as at 43 (Fig. 5) to each of the frame members 34 above shaft 31. The opposite ends of the coil springs are anchored to the oven, the arrangement being such that said springs function to rock the frame 33 in a counterclockwise direction, as viewed in Fig. 5, whereby the follower rollers 38 are maintained in contact with the surfaces of cams 41. The arrangement is such that when shaft 39 is rotated the cams 41 in conjunction with the springs 42 function to rock the frame 33 about the bearings 32—32.

At the lower end of each of the frame members 34 a rod 44 is positioned, said rods comprising, in effect, continuations of the frame members 34—34. A pushed frame 45 of substantially angle iron construction is carried at its opposite ends upon sleeves 46 which slidably engage rods 44. A plurality of pusher plates 47 are mounted upon the pusher frame 45, each of said plates being provided with an elongated opening 49 through which screws 50 pass to adjustably secure each of the pusher plates to the pusher frame. The lower ends of each of the pusher plates 47 are tapered as indicated at 51 in Fig. 3.

A rocker arm 52 is pivotally mounted upon a pin 53 which in turn is secured to one of the channel members 30. A similar rocker arm is also pivotally positioned upon the opposite channel member 30 in substantially the same fashion. Each arm 52 carries at its end a follower roller 54 which rides upon a cam 55 mounted upon shaft 39.

The opposite end of each arm 52 is pivotally connected to a threaded sleeve 56 into which the upper end of a connecting rod 57 is threadedly positioned. A similar sleeve 58 is threadedly connected to the lower end of each connecting rod 57, the opposite end of each sleeve 58 being pivotally connected to boss 59 which extends laterally outwardly from each of the sleeves 46. The end of each arm 52 which is pivotally connected to the threaded sleeves 56 functions as an anchor for one end of a coil spring 60, the opposite end of each of which is anchored upon pin 61 carried upon the opposite channel members 30.

The arrangement is such that when shaft 39 rotates cams 41 together with springs 42 function to rock the frame 33 in a clockwise and counterclockwise direction as viewed in Figs. 2 and 5. Simultaneously cams 55 function to axially move rods 57 upwardly and downwardly. This latter motion causes the pusher frame 46 to be moved upwardly and downwardly along the rods 44. As will be hereinafter more fully described, although frame 33 swings arcuately about bearings 32 the rate of arcuate movement is determined primarily by the shapes of the similar cams 41. By virtue of the shape of the similar cams 55 the pusher plates 51 mounted upon the pusher frame 45 do not describe an arcuate path but describe a path which is substantially a line which conforms to the contour of the surface of plate 8 and ramp 64 over which the biscuits are to be propelled.

Figure 4:
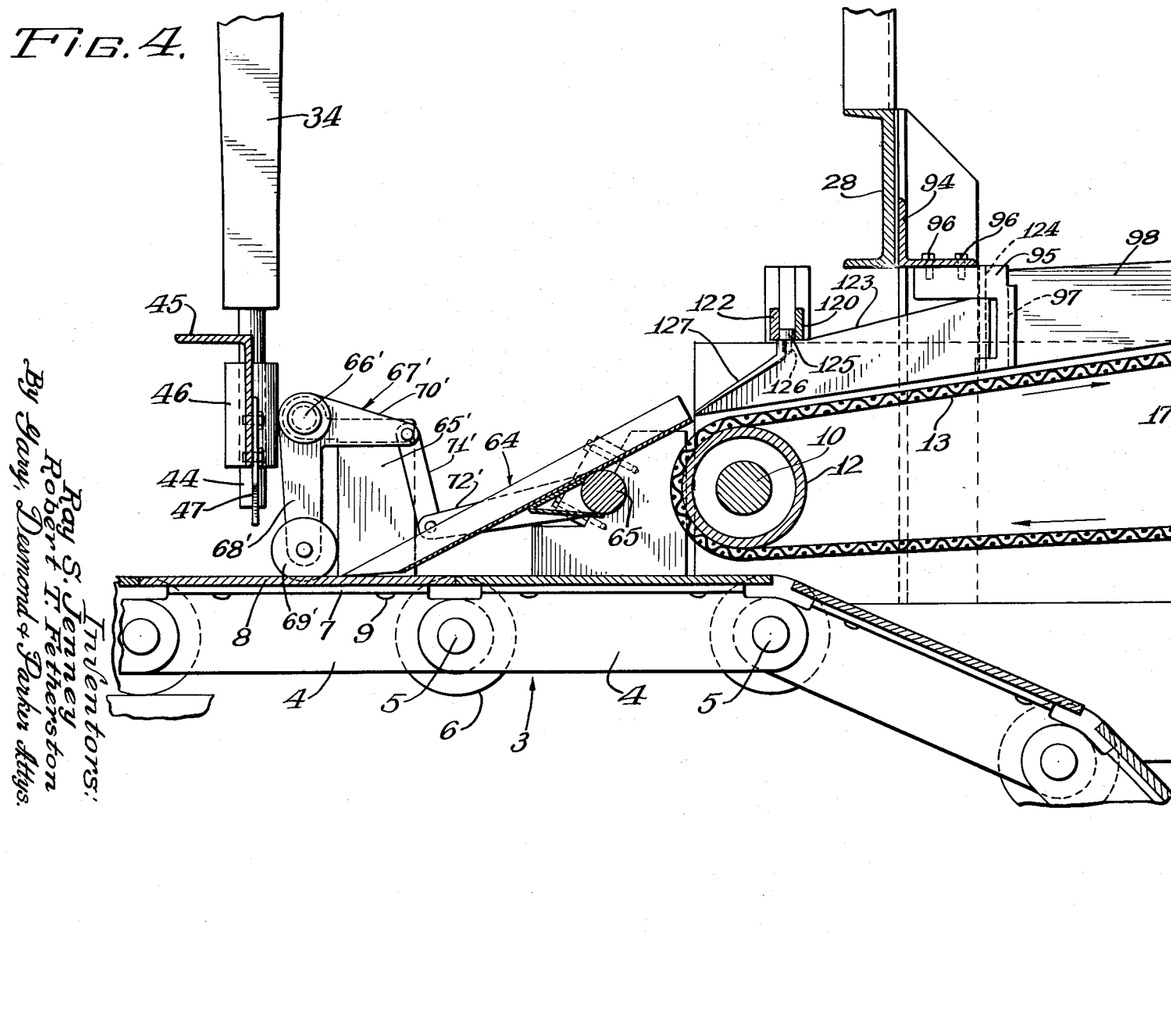
Fig. 4 is a detailed sectional view taken on line 4—4 of Fig. 1, showing mechanism for raising the lower end of the ramp.

Referring particularly to Figs. 1 and 4, a ramp 64 is carried upon a rod 65 which is journaled in the opposite frame members 1—1. The ramp 64 comprises a plurality of inclined passageways 66 which are separated from each other by double tapered walls 67. The lower end of the ramp normally rides upon the upper surfaces of the plates 8 comprising a portion of the oven conveyor 3 and the upper end of said ramp is disposed adjacent the upper surface of roll 12 over which the screen conveyor 13 is trained. The ramp 64, as a whole, is of substantially the same width as the width of the screen conveyor 13.

In the manufacture of shredded wheat biscuits a relatively elongated mass 68 of biscuit material is deposited upon the oven conveyor 3 at the entrance of said conveyor into the oven. The elongated mass 68 is disposed transversely to the direction of travel of the oven conveyor and prior to entering the oven the mass 68 is severed transversely along lines 69 (Fig. 1) thereby forming a plurality of unit shredded wheat biscuits 70 each of which are disposed with its long dimension parallel to the direction of travel of the conveyor and its short dimension transverse to the travel of the conveyor. As the oven conveyor 3 moves forwardly the mass 68 comprising the severed unit biscuits 70 is brought forwardly to the lower end of the ramp 64. The ramp 64 is so disposed as to cause the ends 71 of the double tapered partitions 67 to engage the mass 78 along the lines of severance 69. The number of unit biscuits 70 comprising the mass 68 is equal in number to the number of passageways 66 upon the ramp and hence as the conveyor 3 moves forwardly a unit biscuit 70 enters the lower end of each of the passageways 66 of the ramp 64.

As has been hereinbefore described the frame 33 rocks about the bearings 32 and the pusher plates 47 move along an inclined plane. The rocking movement of the frame 33 is timed to take place shortly after the oven conveyor 3 has moved a row of unit biscuits into the passageways 66. By virtue of the shape of cams 55 the pusher frame 45 is lowered to bring the tapered edges 51 into close proximity to the surface of the double tapered partitions 67 of the ramp 64. In other words, the pusher plates 47 move into a position immediately behind the unit biscuits 70 which enter the passageways 66. As the frame 33 continues its rocking movement the pusher plates 47 slide the unit biscuits 70 upwardly upon ramp 64 through the passageways 66. It can readily be seen that the shape of cams 55 cause the plates 47 to follow a plane parallel to the inclined plane of the ramp.

As has been hereinbefore described, the frames 34—34 are keyed to the shaft 31 by means of the hubs 35 and said frames rock with the shaft in bearings 32—32, the rocking operation being accomplished by the rotation of cams 41 and 55 which, in turn, are keyed to shaft 39. Shaft 39 extends outwardly from one of the bearings 40 and the end thereof is journaled in a bearing 72 (Fig. 3) supported upon frame member 73. A sprocket wheel 74 is loosely mounted upon shaft 39 and a sprocket wheel 75 is keyed to shaft 10. As has been hereinbefore described, shaft 10 is driven in timed relationship with the movement of conveyor 3 through the oven. A sprocket chain 76 is trained around sprocket wheels 74 and 75 whereby rotation of shaft 10 imparts rotation to the sprocket wheel 74.

A spur gear 77 is also loosely mounted upon shaft 39, said spur gear being rigidly connected to sprocket wheel 74. A bearing 78 is loosely mounted upon the connecting portion 79 between sprocket wheel 74 and gear 77, said bearing being carried by frame member 80. A similar bearing 81 is loosely mounted upon shaft 39, said latter bearing being carried by frame member 82. A shaft 83 is journaled in both frame members 80 and 82 and carries a pair of sprocket wheels 84 and 85 which are loosely mounted upon shaft 83 but are rigidly connected together. A spur gear 86 is keyed to shaft 39 and is positioned between the frame members 80 and 82.

The arrangement is such that rotation of the sprocket wheel 74 imparts rotation to the spur gear 77 to which it is rigidly connected. Spur gear 77 rotates gear 84 with which it meshes and hence pinion 85 rigidly connected to the gear 84 is also rotated. Pinion 85 meshes with spur gear 86 and hence shaft 39 is driven since spur gear 86 is keyed to said shaft.

A bar 87 connects frame members 80 and 82 together and a handle 88 is rigidly connected to the bar 87. In view of the fact that bearings 78 and 81 are loosely mounted with respect to shaft 39 and the frame members 80 and 82 are respectively rigidly connected to said bearings the frame members 80 and 82 may be rocked about shaft 39 by the manipulation of handle 88 and in this fashion the phase of rotation of shaft 39 may be altered with respect to the phase of rotation of shaft 10. In can readily be seen that there is a timed relationship between the passage of the biscuits 70 to the passageways 66 with the movement of the pusher plates 47. By the arrangement hereinbefore described a relatively fine adjustment of this timing relationship may be controlled by the manipulation of handle 88.

A segmental plate 89 is positioned adjacent handle 88, said plate being provided with a plurality of arcuately disposed spaced apertures 90. A pin 91 is carried through handle 88, said pin passing through housing 92 which contains a coil spring (not shown). The arrangement is such that by manipulating knob 93 the pin 91 may be withdrawn from plate 89. When the handle has been moved to a desired arcuate position the knob 93 may be released to permit pin 91 to enter a desired aperture 90 in plate 89 in order to fixedly set the relationship of gears 84 and 85 with respect to gears 77 and 86.

An angle iron 94 (Fig. 4) is secured to the front face of channel 28 and extends transversely to the conveyor 13 and is substantially coextensive with the width of said conveyor. A plurality of hinge plates 95 are secured to the angle iron 94 in spaced relationship to each other by means of screws 96. The hinge plates 95 extend vertically downwardly from the angle iron 94 to a position immediately above the upper pass of the screen conveyor 13. The forward edge of each of the hinge plates 95 is provided with a vertical slot 97 which is adapted to receive a guide bar or partition 98. The guide bars or partitions 98 extend parallel to the upper pass of the screen conveyor 13 and are coextensive with a major portion of the upper pass of said conveyor. At the forward end of the machine (Fig. 2a) a pair of supporting members 99 are carried by the side frame members 14—14. An angle iron 100 is secured to the upright members 99 and extends transversely across the machine. The forward portions of the guide or partition bars 98 are secured to the angle iron 100 whereby a plurality of parallel passageways 101 (Fig. 1) are defined above the upper surface of the upper pass of the screen conveyor 13. As will be hereinafter more fully described each passageway 101 is disposed in substantial alignment with the passageways 66 provided on ramp 64.

Figure 6:
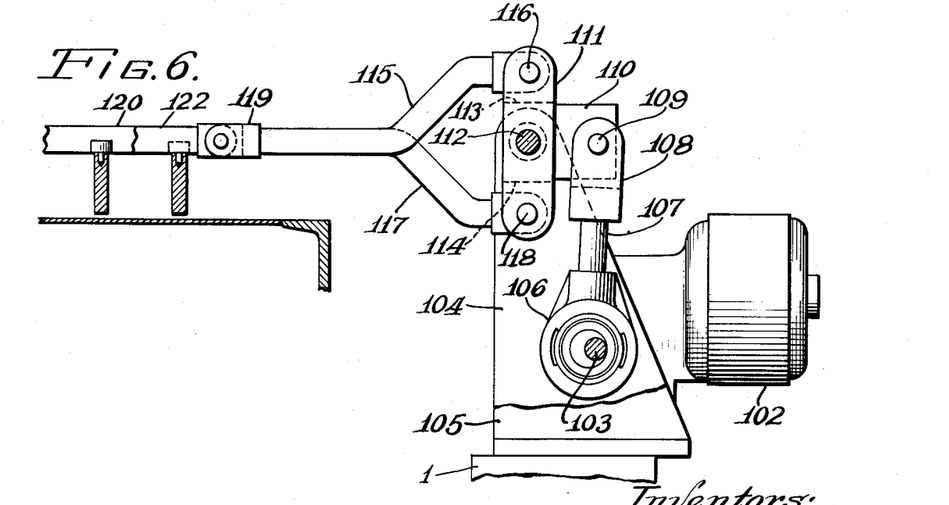
Fig. 6 is a detailed view, parts being shown in section, of the mechanism for vibrating the aligning fingers.

An electric motor 102 is mounted upon one of the main frame members 1, the motor shaft being geared by means of suitable bevel gears (not shown) to shaft 103. A pair of supporting brackets 104 and 105 are positioned in spaced relationship upon the frame member 1 and shaft 103 is journaled in said brackets. An eccentric head 106 embraces shaft 103, said head being connected to rod 107. A clevis 108 is carried by rod 107 at its opposite end and pivotally connects said rod, as at 109 (Fig. 6), to arm 110. Arm 110 comprises an integral portion of a transversely disposed rocking arm 111 and the complete structure is pivoted upon pin 112 secured to the bracket members 104 and 105. Arm 111 is provided with opposite slots 113 and 114 which are offset from each other.

A rod 115 is pivotally connected as at 116 in the recessed portion 113 of arm 11 and similarly rod 117 is pivotally connected, as at 118, in the opposite offset recess 114. Rod 115 is bent intermediate its length inwardly toward rod 117 and similarly rod 117 is bent intermediate its length toward rod 115, a portion of said rods beyond the bends being disposed parallel to each other.

Rod 115 carries at its end a clevis 119 to which a reciprocating bar 120 is pivotally connected. Similarly rod 117 carries at its end a clevis 121 (Fig. 1) which is pivotally connected to a parallel disposed reciprocating rod 122.

The arrangement is such that rotation of shaft 103, driven by motor 102 causes arm 111 to rock about the pivot end 112 due to the eccentric block 106 carried by shaft 103. The rocking of arm 111 results in parallel vibratory reciprocation of the bars 120 and 122. It can readily be seen that although said bars move parallel to each other their direction of movement is reversed with respect to each other.

A finger plate 123 (Fig. 4) carried upon a pivot pin 124 mounted upon hinge plate 95 is disposed with its plane substantially parallel and in substantial alignment with each of the partition bars 98. In effect, the finger plates 123 define continuations of the passageways 101 and 66. Each of the reciprocating bars 120 and 122 carry offset apertured bosses 125 and a screw 126 connects through said bosses to each finger plate 123. The arrangement, however, is such that bars 120 and 122 are connected to alternate finger plates 123. Since during the operation of motor 102 and during the reciprocation of bars 120 and 122 the finger plates 123 are vibrated about the pivot pins 124, adjacent finger plates move in opposite directions.

Each of the finger plates 123 is tapered, as at 127 in Fig. 4, at its free end, the tapered ends of the finger plates terminating adjacent the upper ends of the partitions 67 carried by the ramp 64. During the period that the pusher plates 47 move the unit biscuits 70 upwardly through the passageways 66 the finger plates 123 oscillate back and forth, adjacent plates moving in opposite directions. In the event that any of the biscuits 70 are canted during their movement up the passageways 66, that is, if any of the biscuits 70 do not move parallel to their longest dimension but are canted from this position the vibrating finger plates 123 function to orient the unit biscuits so that said biscuits are delivered to the upper portion of the conveyor screen 13 with their longitudinal edges parallel to the partitions 98. The throw of the eccentric 106 is relatively small, the ends of the finger plates 123 traversing only a relatively small fraction of the width of the passageways 66. In this manner the unit biscuits 70 are caused to move through the passageways 101 upon the surface of the screen conveyor 13.

As has been hereinbefore described the ends 71 comprising extensions of the double tapered partitions 67 normally ride upon the upper surfaces of the plates 8 of the oven conveyor. In view of the fact that the longitudinal edges of adjacent plates 8 are in abutting relationship with respect to each other provision is made for raising the lower end of the ramp before the joints between the adjacent plates pass beneath the ends 71 of the double walled partitions 67.

A supporting standard 65' (Fig. 4) is mounted upon one of the frame members 1. A pivot pin 66' is carried by the standard 65' and a bell crank lever 67' is journaled upon the pivot pin 66'. One arm 68' of the bell crank lever 67' carries a roller 69' at its lower end, said roller being disposed immediately above the path of travel of the rollers 6 on the side of the machine upon which the plate 65' is mounted. The other arm 70' of the bell crank lever 67' is pivotally connected to a link 71' which in turn is pivotally connected at its opposite end to an arm 72'. The arm 72' is rigidly connected to shaft 65 which supports the ramp 64.

The arrangement is such that during the passage of one of the plates 8 beneath the ends 71 of the ramp 64, said ends ride upon the surface of the plate. At this period of operation the arm 68' of the bell crank lever 67' is in the position shown in Fig. 4, the roller 69' being suspended above the path of travel of the rollers 6 of the oven conveyor. As a joint between adjacent plates 8 approaches the ends 71 of the ramp, roller 6 positioned immediately beneath said joint contacts roller 69' and rocks the bell crank lever 67' in a counterclockwise direction, as viewed in Fig. 4, about the pivot pin 66'. This rocking action of the bell crank lever 67' is transmitted to the rod 65 secured to the lower portion of the ramp 64 and said rod is rocked in a clockwise direction thereby raising the ends 71 so as to permit the passage of the joints beneath said ends with no danger of obstruction.

To facilitate the driving of the screen conveyor 13 a pair of sprocket wheels are mounted upon the shaft 10 and also upon the shaft 15 and over the opposite sprocket wheels a sprocket chain 128 is trained on each side of the screen conveyor 13. In this fashion the driving stress is relieved from the screen conveyor.

Figure 9:
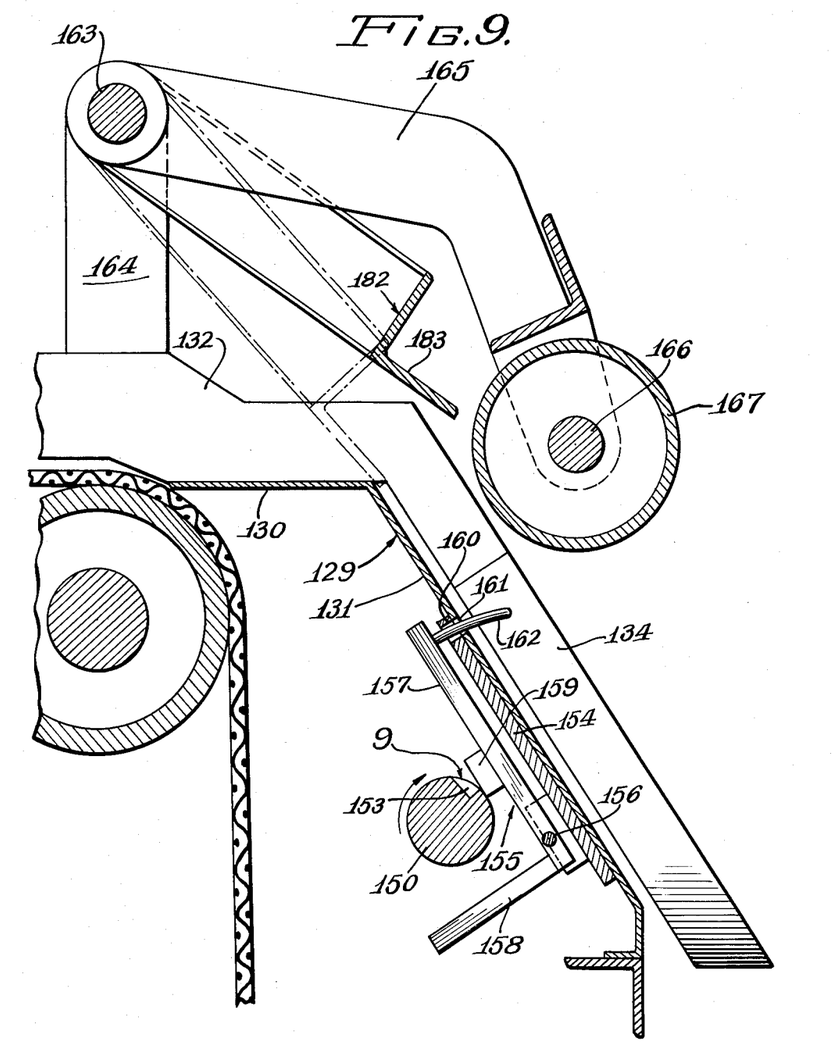
Fig. 9 is an enlarged detailed sectional view taken on line 9—9 of Fig. 1.

At the discharge end of the screen conveyor 13 a ramp 129 (Fig. 9) is mounted upon the frame of the machine. The ramp 129 comprises a substantially horizontal platform portion 130 and an inclined chute portion 131. The ramp 129 at the horizontal portion 130 carries a plurality of spaced partitions 132 which are disposed in alignment with the respective partition bars 198. In this fashion a plurality of passageways 133 (Fig. 1) are provided as continuations of the passageways 101.

Each of the partitions 132 extend downwardly along the chute portion 131 of the ramp 129 and join with curved partition plates 134. The arrangement is such that the passageways 133 communicate with a plurality of curved passageways 135 which are defined by the chute portion 131 and the spaced curved partition plates 134.

Figure 7:
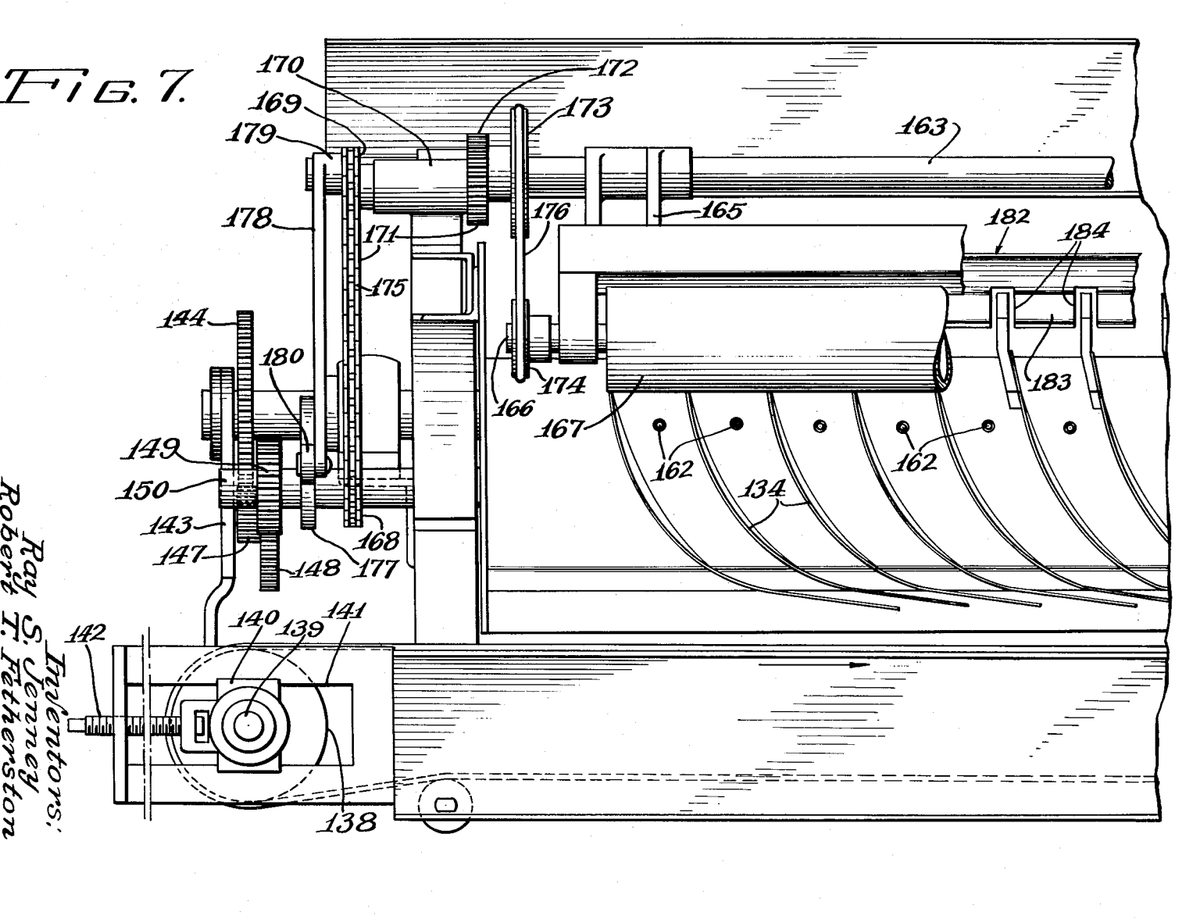
Fig. 7 is an enlarged detailed front elevational view of a portion of the delivery end of the converting device.
Figure 8:
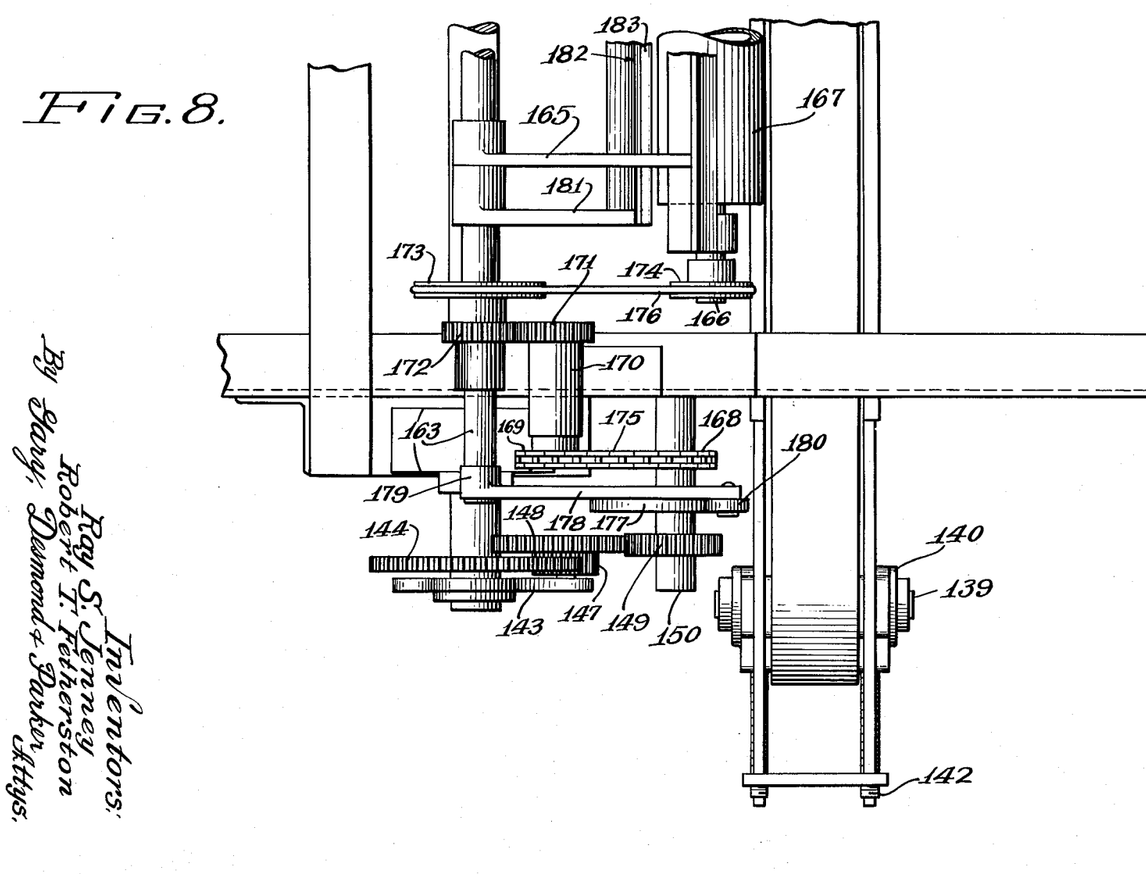
Fig. 8 is a detailed top plan view of the portion of the device shown in Fig. 7.

A conveyor 136 is disposed beneath the lower ends of the curved passageways 35, said conveyor comprising a conveyor belt 137 which is trained at one end around roll 138 (Fig. 7). Roll 138 is mounted upon shaft 139 which in turn is journaled in bearing blocks 140. The bearing blocks 140 are slidably carried in guides 141 whereby by means of screw 142 the conveyor belt 137 may be tensioned to a desired degree.

The conveyor belt travels in the direction indicated by the arrows in Figs. 1 and 7, the upper pass of said belt moving in the direction in which the partition plates 134 are curved.

The arrangement is such that the unit biscuits 70 carried through the passageways 101 upon the screen conveyor 13 are delivered into the connecting passageways 133 above the horizontal portion of the ramp 129. The biscuits then enter the curved passageways 135 and are delivered to the upper pass of the conveyor belt 137. As has been hereinbefore described the unit biscuits 70 travel through the various passageways in the direction of their longitudinal dimension. Hence by the provision of the curved passageways 135 the unit biscuits are delivered to the upper pass of the conveyor belt with their longitudinal dimensions parallel to the length of the conveyor. Side members 143 are provided upon each side of the conveyor belt 137 to prevent lateral displacement of the biscuits upon said belt.

Referring particularly to Figs. 1, 2a, 7 and 8 a spur gear 144 is mounted upon shaft 15. An arcuate plate 143 is loosely positioned upon the end of shaft 15 adjacent the outer side of the spur gear 144. A shaft 146 (Fig. 2a) is mounted upon plate 143 and a pinion 147 is freely rotatable upon said shaft. A spur gear 148 is rigidly secured to pinion 147 and normally meshes with a spur gear 149 carried upon a shaft 150. Plate 143 is provided with an arcuate slot 151 (Fig. 2a) and by means of screw 152 said plate may be locked in a desired angular position. During normal operation plate 143 is so locked as to bring gear 148 into mesh with gear 149 in which case shaft 150 is rotated. If it is desired to prevent the rotation of shaft 150 the plate 143 may be so rocked as to disconnect the driving engagement between gear 148 and gear 149.

Shaft 150 is disposed beneath the inclined chute portion 131 of ramp 129 and throughout the length of said shaft beneath the chute, said shaft is provided with a plurality of notches 153. The notches 153 are spaced from each other along the length of the shaft, there being as many notches 153 as there are passageways 135. The notches 153 in addition to being spaced longitudinally from each other along the length of the shaft are also spaced angularly from each other throughout a portion of the circumference of the shaft. For example, in an embodiment of the present invention wherein there are forty passageways 135, there will be forty notches 153 upon shaft 150, each notch being disposed beneath a respective passageway 135. Angularly, adjacent notches 153 will be displaced 4½° from each other. Of course, if a lesser number of passageways are provided, and the spacing requirement on conveyor 136 remains the same, a corresponding lesser number of notches will also be provided in shaft 150 and the notches will be spaced from each other angularly through a greater angle and the total angular space from the first notch to the last will be decreased. If there are a greater number of passageways and the spacing requirement on conveyor 136 remains the same, a greater number of notches will be employed and the angular spacing of the notches will be smaller, and the total angular space from the first notch to the last will be increased. If the biscuits are to be spaced at a greater interval on the conveyor 136 and the number of passageways remain the same, an increase in the angular spacing between the first and last notch on shaft 150 would be required. If the biscuits are to be spaced at a smaller interval on the conveyor 136 and the number of passageways remains the same, a decrease in the angular spacing between the first and last notch on shaft 150 would be required.

A plate 154 is mounted upon the lower face of the chute 131. A lever 155 journaled upon pin 156 is positioned beneath each of the passageways 135. The lever 155 is L-shaped, one leg of the L, the long leg 157 being disposed substantially parallel to the plate 154. The other leg 158 of the lever is disposed at right angles to the leg 157. A follower block 159 is mounted upon each of the elongated legs 157 of the levers 155, the arrangement being such that the follower blocks 159 normally ride upon shaft 150, the levers 155 being normally urged in a counterclockwise direction as viewed in Fig. 9, by gravity. The short leg 158 of each lever 155 functions as a counterweight to establish a desired degree of pressure in maintaining the follower blocks 159 in contact with the shaft 150.

The plate 154 is provided with a plurality of apertures 160 and the chute 131 is provided with a corresponding number of registering apertures 161. The apertures 160 and 161 open to the lower portion of each passageway 135. A stop pin 162 is mounted upon each long leg 157 of each lever 155, each pin 162 being adapted to protrude through apertures 160 and 161 and extend into a passageway 135.

The arrangement is such that as shaft 150 is rotated the follower blocks 159 carried by the levers 155 sequentially enter the respective notches 153 for part revolution of shaft 150. As the follower blocks 159 enter the notches 153 the corresponding lever 155 rocks in a counterclockwise direction, as viewed in Fig. 9, about the respective pivot pin 156. In so rocking the pin 162 carried by the lever moves outwardly with respect to the corresponding passageway 135. It can readily be seen that in view of the fact that the notches 153 are angularly spaced from each other in a sequential fashion the pins 162 on the respective levers move out of the corresponding passageways 135 in a sequential fashion. Of course, as the shaft 150 continues its rotation the follower blocks 159 ride upon the curved portion of shaft 150 and hence the pins 162 are moved inwardly with respect to the passageways 135 as the respective notch 153 moves away from the follower block 159. Hence, under, what may be termed normal conditions, the pins 162 protrude into the passageways 135 and as the shaft 150 rotates, each of said pins, in a sequential manner, move out of the passageways for about 4½° of travel of shaft 150 and thereafter move back into their normal position within the passageways for the remaining portion of the travel of shaft 150.

A shaft 163 is journaled upon suitable supports 164 disposed on opposite sides of the machine, the shaft being positioned immediately above the passageways 133. A pair of arms 165, only one of which is shown, carry at their lower ends a shaft 166 upon which is positioned a roll 167. The arms 165 are loosely positioned upon the shaft 163 and a stop (not shown) carried by the frame of the machine functions to position the arms 165 in such manner as to dispose the periphery of the roll 167 above the partition plates 134, on a level with passageways 133.

A sprocket wheel 168 (Fig. 8) is carried upon shaft 150 and a sprocket wheel 169 is carried upon the shaft journaled in bearing 170. The opposite end of said shaft carries a spur gear 171 which meshes with a spur gear 172 loosely mounted upon shaft 163. A pulley wheel 173 is rigidly connected to the spur gear 172 and is also loosely mounted upon shaft 163. A second pulley wheel 174 is rigidly mounted upon shaft 166. The arrangement is such that a sprocket chain 175 trained around sprocket wheels 168 and 169 functions to drive spur gear 171 in timed relationship with shaft 150. In turn, spur gear 171 drives gear 172 thereby driving pulley 173 which is operatively connected to pulley 174 by means of belt 176. In this fashion roll 167 is so rotated as to provide a downward thrust on the end of any biscuit which contacts the roll as it proceeds out of passageway 133, thus assuring the contact of all biscuits with chute 131 and stop 162.

A cam 177 is also mounted upon shaft 150. An arm 178 is rigidly connected at one end by means of lug 179 to an extending end of shaft 163. A follower roller 180 is carried at the opposite end of arm 178 and is adapted to ride upon the periphery of cam 177. The arrangement is such that during rotation of shaft 150 and the consequent rotation of cam 177 arm 178 is rocked thereby rocking shaft 163. Referring particularly to Fig. 2a when the high portion of the cam 177 contacts roller 180 arm 178 functions to rock shaft 163 in a counterclockwise direction and when the follower roller 180 rides upon the low portion of the cam 177 the arm 178 is rocked in a clockwise direction.

A pair of arms 181 (Fig. 8) are rigidly connected in spaced relationship to each other upon shaft 163. At the opposite ends of said arms an angle iron 182 is carried. One leg 183, of the angle iron 182, is provided with a plurality of slots 184 (Fig. 7), said slots registering with the partition walls 132. The arrangement is such that when shaft 163 is rocked by the movement of arm 178 the arms 181 and angle iron 182 carried thereby moves successively to the position illustrated in broken lines and full lines in Fig. 9 as the cam roller rolls respectively on the low portion and the high portion of the cam 177. It will be noted that the gear 172 and pulley 173 are loosely mounted upon shaft 163 whereas arm 178 is rigidly connected to said shaft. Consequently, during the operation of rocking shaft 163 the roll 167 is continuously driven.

In the operation of the mechanism hereinbefore described the biscuits move forwardly upon the screen conveyor 13, said biscuits moving substantially abreast of each other. At a predetermined phase of the operation the slotted angle iron 182 will be in the position illustrated in dotted lines in Fig. 9. Consequently, the biscuits will be restrained by the leg 183 of the angle iron 182 from moving forwardly. At this phase of operation the follower blocks 159 carried by the L-shaped levers 155 ride upon that half portion of the shaft 150 which is provided with apertures 153. As the shaft 150 rotates and after the last aperture passes the block 159 associated with the endmost passageway 135, that is, the passageway shown at the lower right of Fig. 1, the cam 177 will have so rotated as to raise the angle iron 182 and permit all of said biscuits to move downwardly in passageways 135 and be retained therein by the stops 162. Thereupon the rotation of cam 177 causes the return of angle iron 182 (Fig. 9) to the lower or dotted position, thus obstructing passageways 133 for the remainder of the cycle. When the first notch 153 engages the follower block 159 associated with the endmost passageway 135, that is, the passageway shown at the upper right corner of Fig. 1, the corresponding stop 162 is retracted permitting the passage of the endmost biscuit downwardly through the curved portion of the corresponding passageway 135 whereby said biscuit is discharged to the surface of the conveyor 136. Subsequently the remaining notches 153 in the shaft 150 encounter corresponding follower blocks 159 whereby said pins are sequentially withdrawn from the passageways 135. The above sequence proceeds from upper right to lower right, as viewed in Fig. 1, thus completing the cycle.

During that period of time that all of the follower blocks 159 ride upon that portion of the shaft 150 which is unnotched, the last biscuit discharged from the lower right passageway 135 has had an opportunity to move on the conveyor belt 137 substantially the width of the machine. As the last biscuit moves beyond the uppermost passageway 135 (Fig. 1) the angle iron 183 will have been raised, all of the biscuits will have been stopped by the pins 162, the angle iron will have been lowered, and the follower block of the uppermost lever 155 will move into the uppermost notch 153. Thereafter the operation will continue in sequential fashion and will be repeated when all of the biscuits held by the stops 162 have been released. In this fashion the biscuits delivered to the conveyor 136 are delivered in a sequential manner, the biscuits following each other in seriatim in spaced relationship to each other. It can readily be seen that by providing notches 153 upon a portion of the circumference of shaft 150 and maintaining the remaining portion of the shaft unnotched a continuous desired spacing of the biscuits upon the conveyor 136 can be obtained.

We claim as our invention:

1. A device for delivering in seriatim individual articles charged to said device in spaced rows transverse to the conveyor which comprises, an endless continuously moving conveyor having an upper delivery pass, partitions carried above and adjacent said upper pass disposed substantially parallel to each other and parallel to the upper pass of the conveyor for dividing the space above said upper pass into a plurality of parallel passageways, means for charging said articles onto said conveyor in spaced transverse rows and into said passageways to dispose said articles in spaced transverse rows in said passageways with one article from each row to each passageway, a continuously moving transverse conveyor disposed adjacent the discharge end of said passageways, means carried at the discharge end of said passageways for releasing articles in sequence from adjacent passageways to said transverse conveyor in spaced series relationship upon said transverse conveyor, and separate single means adjacent the discharge end of said passageways for restraining the passage of a following row of articles from said passageways for a predetermined interval of time after the discharge from said passageways of the last article from the previous row of articles.

2. A device for delivering in seriatim individual articles charged to said device abreast of each other which comprises, an endless conveyor having an upper delivery pass, partitions carried above said upper pass disposed substantially parallel to each other and parallel to the upper pass of the conveyor for dividing the space above said upper pass into a plurality of passageways, means for charging said articles abreast of each other onto said conveyor and into said passageways one article to each passageway, a transverse conveyor disposed adjacent the end of said passageways, and means carried at the discharge end of said passageways for discharging articles from said passageways to said transverse conveyor in spaced series relationship upon said transverse conveyor comprising a movable stop finger projecting into each passageway to obstruct the passage of the article in the passageway, and cam means for sequentially withdrawing said fingers from adjacent passageways.

3. A device for delivering in seriatim individual articles charged to said device in spaced rows transverse to the conveyor which comprises, an endless continuously moving conveyor having an upper delivery pass, partitions carried above and adjacent said upper pass disposed substantially parallel to each other and parallel to the upper pass of the conveyor for dividing the space above said upper pass into a plurality of parallel passageways, means for charging said articles onto said conveyor in spaced transverse rows and into said passageways one article from each row to each passageway, a continuously moving transverse conveyor disposed adjacent the discharge end of said passageways, means carried at the discharge end of said passageways for releasing articles in sequence from adjacent passageways to said transverse conveyor in spaced series relationship upon said transverse conveyor, comprising a movable stop finger projecting into each passageway to obstruct the passage of the article in said passageway, and cam means for sequentially withdrawing said fingers from adjacent passageways, said cam means comprising a rotating cam having part of its surface active and part of its surface inactive to withdraw said fingers whereby articles in said passageways are restrained from moving therefrom during the interval between the discharge of the last article of one row and the discharge of the first article of the next row in sequence.

4. A device for delivering in seriatim individual articles charged to said device abreast of each other which comprises, an endless conveyor having an upper delivery pass, partitions carried above said upper pass disposed substantially parallel to each other and parallel to the upper pass of the conveyor for dividing the space above said upper pass into a plurality of passageways, means for charging said articles abreast of each other onto said conveyor and into said passageways one article to each passageway comprising a frame, means for moving said frame, pusher plates carried by said frame for contacting said articles and push them into individual passageways when the frame moves, a transverse conveyor disposed adjacent the discharge end of said passageways, and means carried at the discharge end of said passageways for sequentially releasing articles from said passageways to said transverse conveyor in spaced series relationship upon said transverse conveyor.

5. In a device for transferring articles moving abreast of each other through a plurality of passageways in seriatim to a conveyor moving at an angle to said passageways which comprises, a pluarlity of stop members disposed in a row transverse to said passageways, one stop member being disposed in each passageway adjacent its discharge end to obstruct movement of an article from each such passageway, cam operated means for moving said stop members to non-obstructing position in sequence to release said articles in sequence, and a continuously moving conveyor disposed adjacent the discharge ends of said passageways to receive and convey said articles in spaced seriatim relationship.

6. In a device for transferring articles moving abreast of each other in sequential rows through a plurality of passageways in seriatim to a conveyor moving at an angle to said passageways, which comprises, a plurality of stop members disposed in a row transverse to said passageways, one stop member being disposed in each passageway, a barrier member movable into barrier position to stop forward movement of a row of articles in said passageways, means for moving said barrier member to release simultaneously said entire row of articles and permit their forward passage to said stop members, means for moving said stop members to non-obstructing position in sequence to release said articles in sequence, and a continuously moving conveyor disposed adjacent the discharge ends of said passageways to receive and convey said articles in spaced seriatim relationship.

7. In a device for transferring articles moving abreast of each other in sequential rows through a plurality of passageways in seriatim to a conveyor moving at an angle to said passageways, which comprises, a plurality of stop members disposed in a row transverse to said passageways, one stop member being disposed in each passageway adjacent its discharge end to obstruct movement of an article from each of such passageways, cam means having an active surface for moving said stop members to non-obstructing position uniformly in sequence to release sequentially the articles from said passageways with the elapse of uniform periods of time, said cam means having an inactive surface for delaying the release of the article in the first passageway for a predetermined longer period of time after the release of the article in the last passageway.

8. In a device for transferring articles moving abreast of each other in sequential rows through a plurality of passageways in seriatim to a conveyor moving at an angle to said passageways, which comprises, a plurality of stop members disposed in a row transverse to said passageways, one stop member being disposed in each passageway adjacent its discharge end to obstruct movement of an article from each of such passageways, means for moving said stop members to non-obstructing position uniformly in sequence to release sequentially the articles from said passageways with the elapse of uniform periods of time, and means for delaying the release of the article in the first passageway for a predetermined longer period of time after the release of the article in the last passageway, said last mentioned means comprising a cam, means for rotating said cam in timed relationship to the passage forwardly of said transverse rows of articles, said cam completing one revolution per row of articles, active cam elements carried upon part of the surface of the cam to effect said uniform release of said articles in sequence, the remainder of said cam surface being inactive to move said stop members to effect said delay in the release of the articles.

9. In a device for transferring articles moving abreast of each other in sequential rows through a plurality of passageways in seriatim to a conveyor moving at an angle to said passageways, which comprises, a plurality of stop members disposed in a row transverse to said passageways, one stop member being disposed in each passageway, a barrier member movable into barrier position to stop forward movement of a row of articles in said passageways, means for moving said barrier member to release said row of articles and permit their forward passage to said stop members, means for moving said stop members to non-obstructing position in sequence to release said articles in sequence, and a continuously moving conveyor disposed adjacent the discharge ends of said passageways to receive and convey said articles in spaced seriatim relationship, said barrier member moving means being timed to release a row of articles after all articles have been released by said stop members.

10. A device for delivering in seriatim individual articles charged to said device abreast of each other which comprises, an endless conveyor having an upper delivery pass, means for charging articles abreast of each other onto the upper pass of said conveyor, a transversely moving conveyor disposed adjacent the delivery end of said first-mentioned conveyor, and means carried at the delivery end of said first mentioned conveyor for sequentially discharging said articles to said transverse conveyor in spaced series relationship upon said transverse conveyor, said last mentioned means comprising a plurality of stop fingers for obstructing movement of said articles to said transverse conveyor, and means for sequentially moving said fingers from obstructing position.

References Cited in the file of this patent

UNITED STATES PATENTS

| | | |
|---|---|---|
| 2,071,859 | Steiner | Feb. 23, 1937 |
| 2,135,778 | Wyland | Nov. 8, 1938 |
| 2,205,106 | Paterson | June 18, 1940 |
| 2,295,232 | Mitchell | Sept. 8, 1942 |
| 2,404,882 | Monaco | July 30, 1946 |
| 2,415,941 | Edson | Feb. 18, 1947 |
| 2,456,031 | Spain | Dec. 14, 1948 |
| 2,603,340 | Warren | July 15, 1952 |
| 2,646,870 | Parry | July 28, 1953 |